Oct. 11, 1960

P. W. MORGAN 2,955,324

PROCESS OF IMPROVING THE DYE RECEPTIVITY IN MECHANICALLY STRESSED SOLID POLYMERS

Filed May 18, 1953

A  B  C

D  E

INVENTOR
Paul W. Morgan
BY Charles F. Daley
ATTORNEY

United States Patent Office 2,955,324
Patented Oct. 11, 1960

2,955,324

PROCESS OF IMPROVING THE DYE RECEPTIVITY IN MECHANICALLY STRESSED SOLID POLYMERS

Paul W. Morgan, West Chester, Pa., assignor to E. I. du Pont de Nemours and Company, Wilmington, Del., a corporation of Delaware Filed May 18, 1953, Ser. No. 355,621

2 Claims. (Cl. 18—47.5)

This invention relates to the coloring of polymeric structures and more particularly to the improved dyeing of stressed regions of fibers and films, especially those comprised of basic-modified polymers.

In the dyeing art, a common method of increasing the receptivity of a material for a particular class of coloring substances is modification of the material by incorporating in it an agent to which the chosen coloring substance will be drawn or attached. Preparation and use of suitable additives for cellulosic materials, especially for esters and ethers of cellulose, are described in detail in Heckert Patents 2,168,335 to 2,168,338 inclusive. The many amino basic additives described by Heckert, particularly amino alcohol esters of acrylic or alpha substituted acrylic acid in the amounts as described in 2,168,338, have proved quite effective in raising the dye receptivity of lower aliphatic acid esters of cellulose particularly. Polymers containing basic additives, including any of the kinds suggested by Heckert, will be referred to herein as "basic-modified" without importing any limitation to cellulosic polymers only. Increased dyeability produced by this modification of polymeric structures is relatively independent of customary reduction in dyeability accompanying any increased macromolecular orientation, which may be produced by drawing, stretching, or otherwise extending the structure. Such extension or a bending, twisting, or other gross distortion of the structure produces what is called herein a "stressed" region in the structure, if sufficiently solid.

A primary object of this invention is the modification of dye receptivity of shaped polymeric structures. Another object is the production of polymeric structures with decreased coloration in regions of induced dye resistivity. A further object is the manufacture of fiber structures having increased receptivity for acid dyes in stressed regions of the fibers. Also, an object is the production of fibers having pronounced diametral irregularities along their length and exhibiting increased receptivity to acid dyes at the regions of small diameter. Another object is the manufacture of basic-modified yarn, fabrics, and films patterned with color according to the location of treated regions in the materials. Other objects of this invention will be apparent from the following description and the accompanying diagrams.

Figure 1:
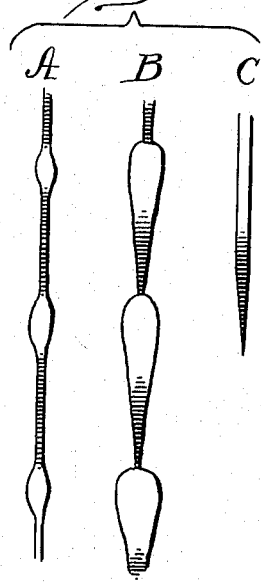
Figure 2:
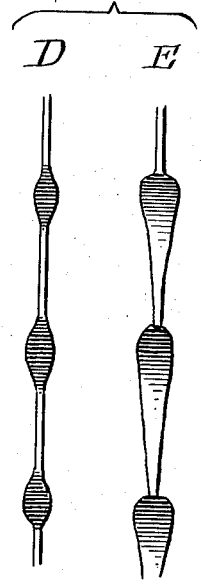
Figure 3:
Figure 4:
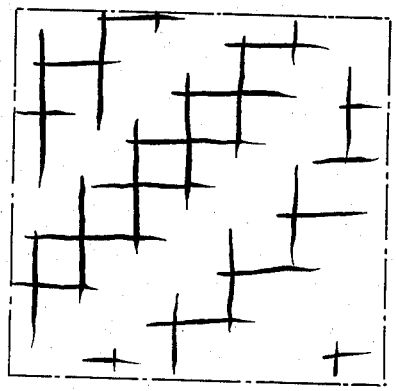

Figure 1 shows by shading the variation in coloration depth of nubby and tapered filaments treated according to this invention. Figure 2 reveals the appearance of nubby and tapered filaments prepared in a conventional manner. Figure 3 illustrates the darker stressed regions in a film prepared according to this invention. Figure 4 shows the surface of a fabric patterned according to this invention.

The increased receptivity of basic-modified polymeric structures to certain dyes may be counteracted by incorporation of small amounts of additives having a plurality of acid groups per molecule. The resulting resistance to dyeing is generally most pronounced when the basic modifier contains two or more basic-reacting groups, such as amino or hydroxyl sites. In general, the addition of a simple dibasic organic acid to the basic-modified polymer is adequate, but substances having more than two acid groups also increase dye resistivity similarly. Structures modified by incorporation of such acidic additives may be referred to herein as "poly-basic-acid-modified." Consequently, when the materials described by Heckert or other suitable polymeric structures are subjected to this further modification they may be denominated by the words "basic-modified, polybasic-acid-modified" or; more simply, "basified, polyacidified."

Basic-modified polymeric structures having been polybasic-acid-modified so as to mask or apparently destroy their induced preference for taking up certain dyes may also have this dye receptivity restored according to this invention. This is accomplished by stressing or distorting the wet structure. Stressing dried structures does not give the beneficial results of this invention, being ineffective to restore color or dye acceptance in the stressed regions. However, once the receptivity has been restored in wet-stressed regions, the structure may be dried or otherwise stressed or distorted without affecting the receptivity. It is essential that the polymeric structure be stressed while actually wet, i.e., having been brought in intimate contact with a liquid that is a swelling agent or near solvent for the structure. Water often is suitable, either in the form of wet steam or as a liquid at lower temperatures. In some instances other liquids, e.g. alcohols, will prove more effective. In complying with this requirement a liquid-swollen polymeric structure is considered to be wet. Finally then, this invention provides for the coloring of a wet-stressed basified, polyacidified polymeric structure.

Effective stressing may be accomplished by any appropriate means. Thus a suitable filament or film may be passed soon after extrusion into a wetting bath, which in some systems of manufacture may constitute a part of the conventional processing, and then be drawn, flexed, stretched, or otherwise distorted to render it operable in the process. The basic and polybasic-acid modifiers may be incorporated before extrusion, as by addition to the spinning or casting solution, or after extrusion, as by a bath, impregnation, or spray. Pronounced swelling of the structure is a desirable aid to introduction of the modifiers by aftertreatment. Both modifiers must be present before the required stressing occurs in order to achieve the beneficial effect accomplished by the invention. In keeping with the quantities suggested in the Heckert patents the basic-modifier may be present to the extent of from about 1% or less up to about 20% to 30% of the weight of the fiber or film polymer, or even more. In general, several percent will prove adequate. The polybasic acid may be satisfactory at a level of only a few tenths of 1% based on the fiber or film weight, but an amount of several percent usually is desirable, and amounts of the order of 10% to 15% may be used on occasion. Useful proportions of the modifiers for the practice of this invention may be determined easily by the exercise of operative skill. Specific quantities are shown in the examples below.

*Example I*

A solution of cellulose acetate and dimethylaminoethylmethacrylate polymer in the weight ratio of 100:5 is made up in 45 parts of a 1:1 mixture of acetone and dimethylformamide. After the addition of 1.75 parts of adipic acid to the solution, the resulting composition is cast onto a clean, dry glass surface in air, all at 25° C. With moderate air circulation a gelid film forms in about half a minute, and it is allowed to dry overnight at room temperature. Then this film is removed from the casting surface and placed in 50 times its volume of cool water for one minute. The film is removed from the water and crumpled by hand and then smoothed out and allowed to dry at room temperature. Upon dyeing in a 0.1% aqueous solution of Pontacyl Rubine R (Colour Index #179) at a 50:1 ratio of dye-bath to film at 85° C. for 10 minutes, the resulting material exhibits a streaked dye pattern as shown in Figure 3, the brilliant red of the dyeing being represented as black in the diagram. The dark network shown is not traceable to any fibrous remnant in the film, which before dyeing is transparent throughout to visible light, as well as to ultra-violet and X-ray, but is attributable solely to the internal changes produced in the film by the crumpling action while wet.

A sample treated similarly except for being hot-pressed after drying and before dyeing showed the same uneven abnormal affinity for the dye. Crumpling a similar sample while dry and then attempting to dye it did not produce increased coloration in the stressed portions. Abrading and cutting the surface of similar dry samples of the film did not produce any preferential dye take-up either.

*Example II*

Yarn of 64 filaments totaling 200 denier, is prepared by extruding a solution of 100 parts cellulose acetate, 4 parts diethylaminoethylmethacrylate, and 1 part succinic acid in acetone-dimethylformamide (1:1) (50 parts) in a conventional manner. It is passed through an aqueous bath at room temperature and at a rate so that each part of the yarn is under the surface of the liquid for a total time of about 30 seconds and then around a heated (about 70° C.) grooved roll in the manner described by Meloon in Patent 2,296,394. It extends at the heated portions to produce a nubby or "thick and thin" yarn. A skein of this yarn is immersed in a 0.1% aqueous solution of Anthraquinone Blue SEN (Colour Index #1053) at 85° C. and agitated for 5 minutes, then removed and dried. The thin portions are now a deep blue color, while the thick or nubby parts are only a very pale blue, the respective coloration densities in single filaments being suggested by shading at A in Figure 1, which presents magnified views of filaments treated according to this invention. This is almost exactly the opposite of the normal result of dyeing an unmodified or even a basic-modified nubby acetate yarn, which takes up much greater amounts of color in the thick nubs than in the attenuated regions. At D, Figure 2 shows the dyeing variation for similar nubby acetate filaments spun in the same way without addition of modifiers. It is clear from this comparison that the relation between degree of dye take-up and diameter of the filaments is practically completely opposite in these two situations. Tapered filaments prepared conventionally by varying the ratio of windup speed to rate of draw-off, as described by Slaughter in Patent 2,433,325, show the gradation of dyeing even more clearly than do nubby filaments. A tapered filament modified and treated according to the present invention is shown at B in Figure 1, for comparison with the result of ordinary dyeing of a similarly tapered product shown at E in Figure 2.

The polymer may be treated with polybasic acid before the addition of the other modifier, if desired. The order of combination suggested in the examples is not critical, but distribution of the modifiers throughout the polymer is aided considerably by adding the modifiers sequentially rather than together because modifiers capable of forming the described dye-resists customarily precipitate in the presence of each other. A useful test for operability of basic and polybasic-acid modifiers according to this invention is simply to mix the two kinds of modifiers in a suitable medium, which may be the solvent for a fiber- or film-forming polymer (i.e. in the absence of the polymer itself); if a noticeable precipitate forms, the two modifiers usually will be dye-resistive when dispersed through or on the polymeric structure.

Restoration of dyeability to parts of the structure stressed while wet may not occur at low degrees of swelling of the polymeric structure. One way to estimate the amount of swelling or solvent action required before ordinary stressing should become effective is to try the swelling action on the precipitate formed by the modifiers in the absence of the polymer that is to form the eventual structure; appreciable swelling of the precipitate is a strong indication of such operability. For example, the addition of an equal quantity of dimethyl formamide to acetone containing the modifiers of Example I above swells the precipitated modifiers noticeably; this is a clue to their usefulness in the polymeric system of that example. In the absence of dimethyl formamide from the otherwise identical system of Example I, the resultant structure becomes not only resistant to acid dyes but also incapable of being rendered receptive by wet-stressing unless another suitable swelling agent is added. Advantage may be taken of this feature of the invention by adding only one of the modifiers before formation of the polymeric structure, which then can be aftertreated in selected areas or portions by application of the other modifier, e.g. by a sort of "printing" process, to inhibit dye reception only in the areas so contacted. This permits the formation of patterned films, fabrics, or the like.

The quantity of polybasic acid required to inhibit the dye receptivity induced by basic modification is dependent upon many variables, but it is easily ascertainable. For example, a composition of 100 parts cellulose acetate and 5 parts dimethylaminoethylmethacrylate polymer dissolved in acetone required the following parts of the respective acids for good dye-resistivity:

Not more than one part sulfuric, phosphoric
More than one but not more than two parts fumaric, α-tartaric, adipic, terephthalic, isophthalic, oxalic dihydrate, sebacic
More than two but not more than three parts maleic Higher concentrations of some polybasic acids are required, e.g. sterically hindered acids, such as o-phthalic, 1,1-cyclohexane dicarboxylic, salicylacetic.

In addition to the cellulosic polymers mentioned by Heckert, many other polymers may be basified satisfactorily. Usually, they may be polyacidified beforehand with good results, as well as after basification. As examples may be mentioned the polyesters, vinyl polymers, such as polyacrylonitrile, vinylidene polymers, polysulfonamides, polyurethanes, and the polycarbonamides. Under conditions compatible with distribution of polybasic acids in or on these polymers, they will prove to be suitable for wet-stressing according to this invention. Any polymers having inherently dye-receptive chain ends should be modified to mask the end groups, as by introduction of acetyl or other suitable radicals.

The most suitable coloring agents are those to which polybasic-acid-modification of the basic-modified polymeric structures creates an almost total resistivity. They are known primarily as "acid" dyes, although dyes of other types exhibiting acid reactivity also are satisfactory. In addition to those named in the examples, the following dyes may be used: Pontacyl Carmine 2G (Colour Index #31), Pontacyl Green SON (Colour Index #737), Pontacyl Light Yellow GG (Colour Index #636), Dupont Orange RO (Colour Index #161) and Pontacyl Wool Blue GL (Colour Index #833). Many other dyes operable in the practice of this invention will come readily to the mind of anyone skilled in the art of textile dyeing. Dyestuffs with particularly large molecules may fail to provide the same degree of contrast between the stressed and unstressed regions, possibly because of their inability to penetrate the structure sufficiently.

Similar effects may be obtained using these dyes on wet-stressed cellulose derivatives modified by the addition of chitosan, gelatin, or casein in moderate amounts.

High concentrations of these modifiers (e.g., 20 parts of gelatin per 100 parts of cellulose acetate) produce general dyeability without stressing. These compositions may be made dye-resistant by incorporating polybasic acids as before. These dye-resistant structures become dyeable in regions which are wet-stressed.

As shown in Figure 4, fabric (as well as film) composed of basified and polyacidified material according to this invention, can be patterned easily by wet embossing, as by impression with a grooved roller or a ridged plate before dyeing. Films so prepared will reproduce writing impressed on them (while wet) with a stylus or typewriter or any similar means of imposing the requisite stress. Fibers for synthetic furs, modified as described here may be stretched at the ends and dyed to produce the subtle color gradation characteristic of natural fur fibers, as shown at C in Figure 1. Numerous other novel effects may be obtained without a departure from the inventive concept.

What is claimed is:

1. The novel process comprising providing a solution, in equal parts of acetone and dimethylformamide, of (1) cellulose acetate capable of pronounced swelling in water and (2) from about 1% to about 30% by weight of a polymeric amino alcohol ester of an acid taken from the group consisting of acrylic acid and alpha-methyl-acrylic acid, said ester rendering the cellulose acetate acid-dye-receptive; adding a polybasic acid to said solution in an amount between about 1% and about 15% by weight sufficient to inhibit acid-dye-receptivity, said acid being taken from the group consisting of maleic, adipic, sebacic, succinic, sulfuric, phosphoric, fumaric, α-tartaric, oxalic dihydrate, terephthalic, isophthalic, ortho-phthalic, 1,1-cyclohexane dicarboxylic, and salicylacetic; forming a solid structure from said solution; immersing the structure in water for at least 30 seconds until the structure swells pronouncedly; mechanically extending and stressing the structure at spaced intervals until the extended and stressed portions become acid-dye-receptive, the nonextended portions being acid-dye-resistant; and dyeing the structure with an acid dye whereby the extended and stressed portions only accept the dye.

2. The novel process of claim 1 wherein the solid structure is a filament.

References Cited in the file of this patent
UNITED STATES PATENTS

| | | |
|---|---|---|
| 2,168,338 | Heckert | Aug. 8, 1939 |
| 2,168,348 | Izard | Aug. 8, 1939 |
| 2,200,134 | Schlack | May 7, 1940 |
| 2,296,394 | Meloon | Sept. 22, 1942 |
| 2,623,806 | Fuchs | Dec. 30, 1952 |

UNITED STATES PATENT OFFICE

CERTIFICATE OF CORRECTION

Patent No. 2,955,324　　　　　　　　　　October 11, 1960

Paul W. Morgan

It is hereby certified that error appears in the printed specification of the above numbered patent requiring correction and that the said Letters Patent should read as corrected below.

Column 6, line 28, list of references cited, under "UNITED STATES PATENTS" add the following:
-- 2,278,888　　　Lewis ------Apr. 7, 1942 --.

Signed and sealed this 11th day of April 1961.

(SEAL)
Attest:
ERNEST W. SWIDER

Attesting Officer

ARTHUR W. CROCKER
Acting Commissioner of Patents